United States Patent [19]

Nakao et al.

[11] B 3,996,565

[45] Dec. 7, 1976

[54] PROGRAMMABLE SEQUENCE CONTROLLER

[75] Inventors: Hisaji Nakao, Toyota; Yasufumi Tokura; Toshihiko Yomogida, both of Kariya; Kazuo Matsuura, Chiryu, all of Japan

[73] Assignees: Toyoda Koki Kabushiki Kaisha; Toyoda Jidosha Kogyo Kabushiki Kaisha, both of Japan

[22] Filed: July 3, 1974

[21] Appl. No.: 485,575

[44] Published under the second Trial Voluntary Protest Program on February 24, 1976 as document No. B 485,575.

[30] Foreign Application Priority Data

Apr. 19, 1974 Japan .............................. 49-44626
Apr. 19, 1974 Japan .............................. 49-44627

[52] U.S. Cl. ............................................. 340/172.5
[51] Int. Cl.² ............................................ G05B 11/32
[58] Field of Search ................. 340/172.5; 235/152

[56] References Cited

UNITED STATES PATENTS 3,686,639  8/1972  Fletcher et al. ................ 340/172.5
3,753,243  8/1973  Ricketts, Jr. et al. .......... 340/172.5
3,806,714  4/1974  Otsuka et al. ..................... 235/152
3,810,118  5/1974  Kiffmeyer ....................... 340/172.5
3,849,765  11/1974  Hamano ......................... 340/172.5

OTHER PUBLICATIONS

G. Lapidus, "Programmable Logic Controllers—Painless Programming to Replace the Relay Bank," *Control Engineering*, Apr. 1971, pp. 49-60.
N. Andreiev, "Programmable Logic Controllers—An Update," *Control Engineering*, Sept. 1972, pp. 45-47.

*Primary Examiner*—David H. Malzahn
*Attorney, Agent, or Firm*—Oblon, Fisher, Spivak, McClelland & Maier

[57] ABSTRACT

A sequence controller comprising a logic operation circuit for examining an external input with an examine command in accordance with a program. The logic operation circuit comprises block means for discontinuing a next examination of a logical function of a group of logical functions in response to a preceeding examination result of a logical function to thereby execute a logic operation non-sequentially.

7 Claims, 12 Drawing Figures

PROGRAMMABLE SEQUENCE CONTROLLER

BACKGROUND OF THE INVENTION

1. Field of the Invention

The present invention relates to a sequence controller capable of performing a desired sequence control by applying into a memory device a program which is made in accordance with a sequence circuit.

2. Description of the Prior Art

The conventional sequence controller, such as that disclosed in U.S. Pat. No. 3,753,243, entitled "Programmable Machine Controller", patented Aug. 14, 1973, examines or compares periodically and sequentially all input conditions (values of the sensor outputs) with the examine commands in accordance with the program.

Figure 9:
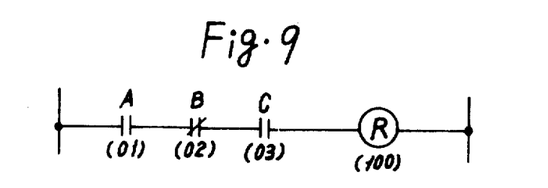
FIGS. 9, 10, 11 and 12 are circuit diagrams showing exemplified models of the contacts and connections of electrical ladder circuits.
Figure 10:
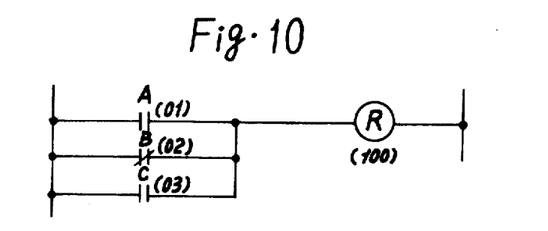

However, if a group of logical AND functions are examined, as shown in FIG. 9, if the examination result of one of the logical AND functions is not satisfied, the whole operation of the logic AND functions is not satisfied regardless of the conditions of the remaining logical AND functions. If a group of logical OR functions are examined, as shown in FIG. 10, if the examination result of one of the logical OR functions is satisfied, the whole operation of the logic OR functions is satisfied regardless of the conditions of the remaining logical OR functions. Thus, if one of the logical AND functions is not satisfied in a group of logical AND functions being examined, it is not necessary to examine the remaining logical AND functions. In the case of a group of logical OR functions being examined, if one of the logical OR functions is satisfied, it is not necessary to examine the remaining logic OR functions. The examination of the remaining input conditions, as made in the sequence controller disclosed in the U.S. Pat. No. 3,753,243, is not necessary and therefore any opportunity for malfunction during the examination of the remaining input conditions is effectively prevented.

SUMMARY OF THE INVENTION

It is, therefore, an object of the present invention to provide a new and improved sequence controller for avoiding a malfunction of a logic operation to increase the reliability of the sequence controller.

Another object of the present invention is to provide a new and improved sequence controller for shortening a command executing cycle to increase the control capacity.

Another object of the present invention is to provide a new and improved sequence controller capable of performing a desired sequence control without executing a logic operation of the remaining input conditions in response to a preceeding examination result of an input condition to thereby execute a logic operation non-sequentially.

Still another object of the present invention is to provide a new and improved sequence controller wherein a cycle change is made in response to an examination result of a logical function to thereby execute a logic operation non-sequentially.

Other objects will appear hereinafter.

BRIEF DESCRIPTION OF THE DRAWINGS

The foregoing and other objects of the present invention will be more fully appreciated as the same becomes better understood from the following detailed description of the preferred embodiments when considered in connection with the accompanying drawings, in which.

DETAILED DESCRIPTION OF THE PREFERRED EMBODIMENTS

Figure 1:
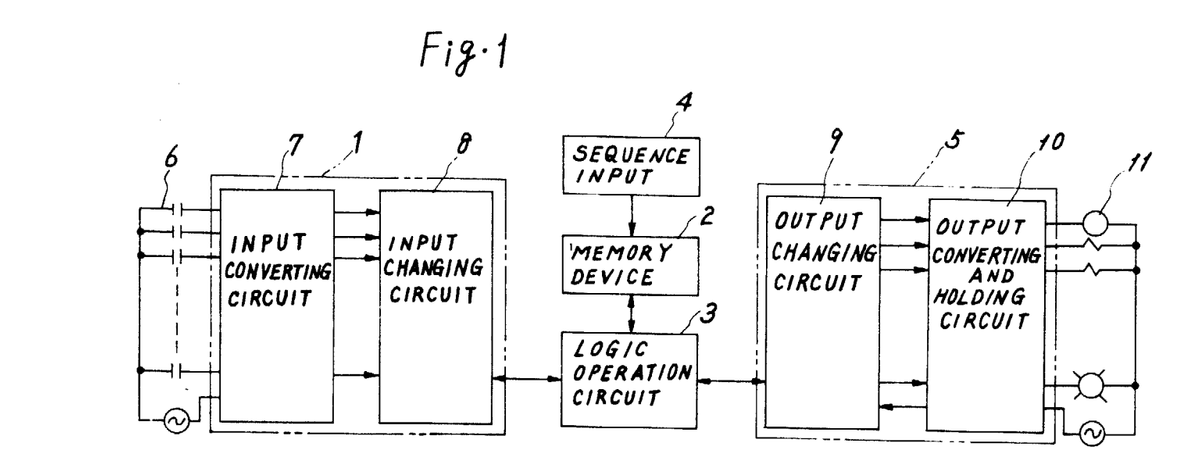
FIG. 1 is a block diagram showing an outline of a sequence controller according to the present invention.

Preferred embodiments of the present invention are described hereinunder with reference to the accompanying drawings wherein like reference numerals designate identical parts throughout the several views. FIG. 1 shows the outline of a sequence controller according to the present invention comprising an input module 1, a memory device 2, a logic operation circuit 3, a sequence input 4 and an output module 5. The input module 1 is connected to input contacts 6 to receive the logical conditions thereof (e.g., ON or OFF). The sequence is controlled in accordance with the change of conditions of the input contacts 6. The input module 1 comprises an input converting circuit 7 and an input changing circuit 8. The input converting circuit 7 converts each condition of input contacts 6 into the logical status (e.g., ONE or ZERO) to be used as an input signal.

The input changing circuit 8 selects one of the input contacts 6 identified by the logic operation circuit 3 and transmits the status thereof (e.g., ONE or ZERO) to the logic operation circuit 3. The sequence input 4 is an input device to program and input the contents of sequence control which are represented by relay contacts and the like. This sequence program is memorized in the memory device 2. The logic operation circuit 3 executes an operation in accordance with a program stored in the memory device 2 and applies a resultant output to the output module 5. The output module 5 comprises an output changing circuit 9 and an output converting and holding circuit 10. The output changing circuit 9 selects one of the output devices 11 such as relays or solenoids in accordance with an output information from the logic operation circuit 3. At the same time, the output changing circuit 9 serves to transmit the status of the output devices 11 to the logic operation circuit 3. The output converting and holding circuit 10 is operated in accordance with output information from the logic operation circuit 3 through the output changing circuit 9 to memorize information therein and also to transmit an amplified electric current to energize the output devices 11.

In this embodiment, a program stored in the memory device 2 comprises 16 bit words. The first 5 bits of the word are used for a command and the remaining 11 bits are used to identify an input or output address number from 1 to 2048. Therefore a command and an input or output address number can be represented by one word.

Table I shows various kinds of commands.

TABLE I

| Type | Symbol | Meaning |
|---|---|---|
| Input Examine Command | TNA | examine by logical AND function whether input is ON |
| | TFA | examine by logical AND function whether input is OFF |
| | TNO | examine by logical OR function whether input is ON |
| | TFO | examine by logical OR function whether input is OFF |
| | TNE | examine by logical OR function whether input is ON and indicate the final result |
| | TFE | examine by logical OR function whether input is OFF and indicate the final result |
| Output Command | YON | set output if result of input examination is satisfied; reset output if result of input examination is not satisfied |
| | YOF | set output if result of input examination is not satisfied; reset output if result of input examination is satisfied |
| Jump Command | JMY | jump if result of input examination is satisfied |
| | JMN | jump if result of input examination is not satisfied |

In each memory address, a command shown in TABLE I and an input or output address or a memory address identified by a jump command are memorized, and the memory device 2 successively reads out these programs as that the logic operation circuit 3 executes these instructions.

Figure 2:
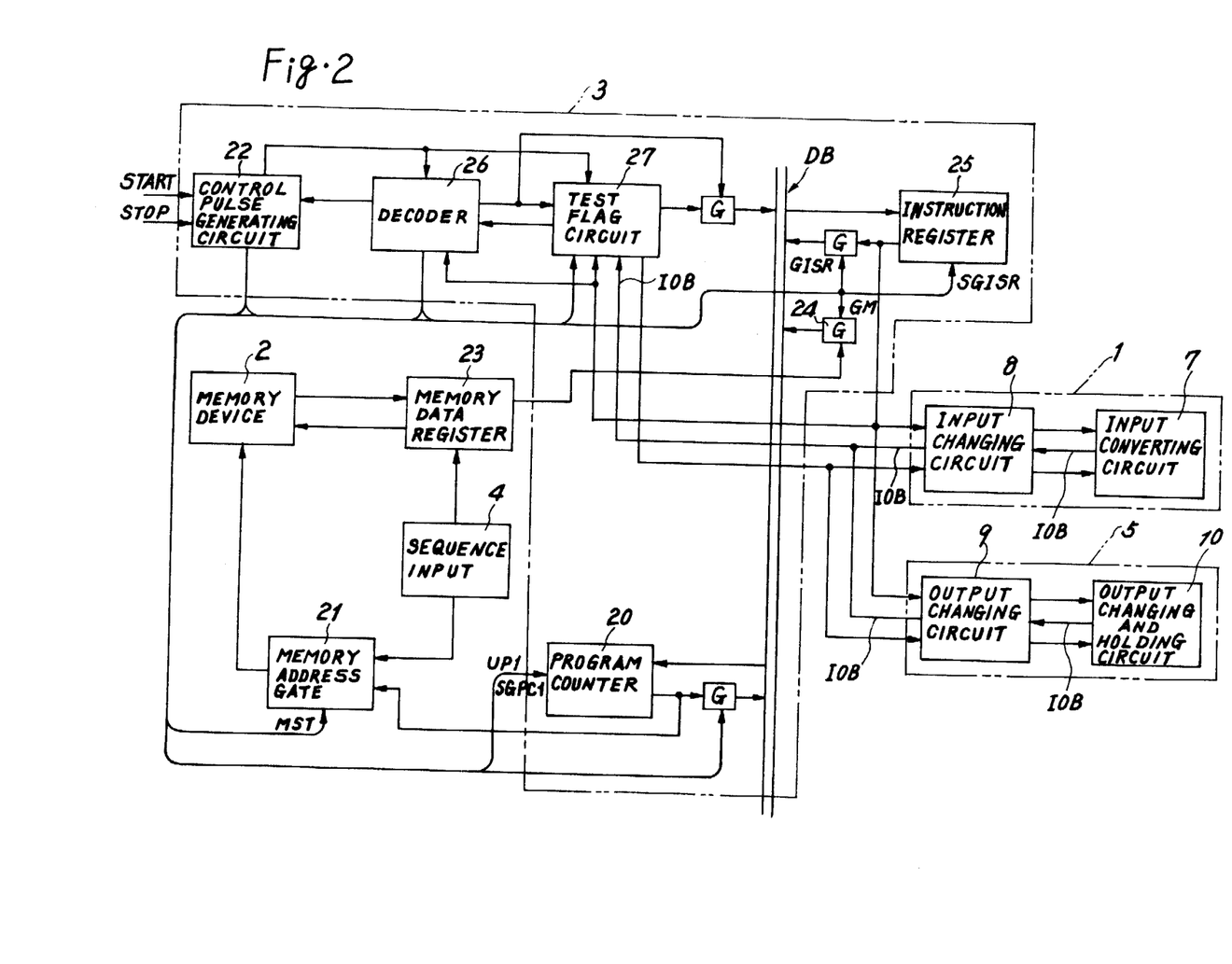
FIG. 2 is a detailed block diagram showing a logic operation circuit.
Figure 4:
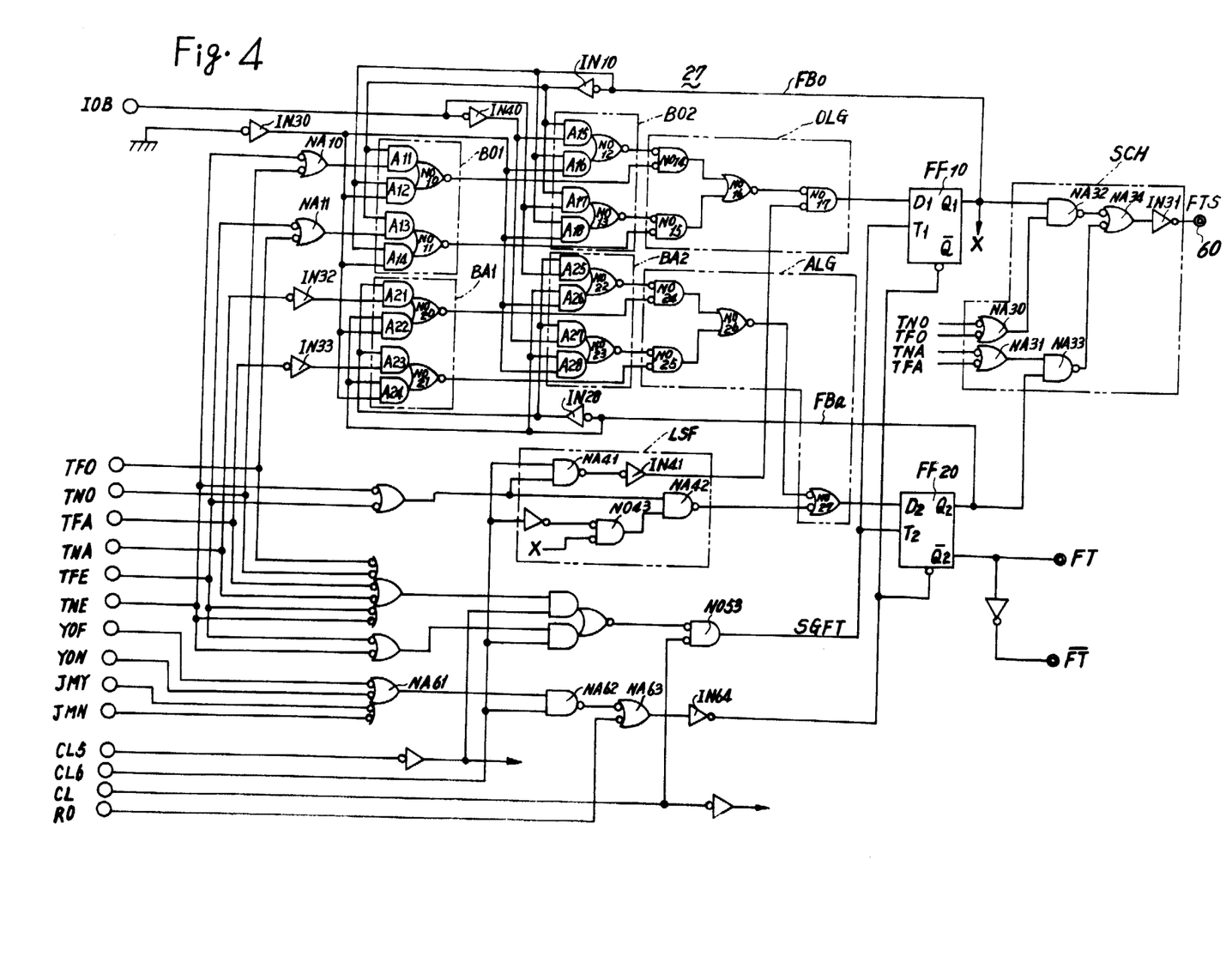
FIG. 4 is a circuit diagram showing a test flag circuit which is included in the logic operation circuit.

Referring to FIG. 2 showing a detailed block diagram of the logic operation circuit 3, the memory device 2 memorizes the above described programmed sequence. An address of the memory device 2 is designated by a program counter 20. The content of the program counter is increased one by one in response to a control signal UP1 from a control pulse generating circuit 22 which is described hereinafter. The program counter 20 counts the number of the address in the memory device 2 and applies the counted value to the memory device 2 when a memory address gate 21 is opened by a control signal MST from the control pulse generating circuit 22 so that the content of the memory divice 2 is successively cyclically read out. The read out content of the memory device 2 is fed to a memory data register 23 and then to an instruction register 25 through a data bus line DB when a memory gate 24 is opened by a control signal GM and preset therein by a control signal SGISR. The first 5 bits of the instruction register 25 are used for the commands and the remaining 11 bits are used for the input or output address or the memory address. The content of the first 5 bits is distinguished by a decoder 26 and fed to the control pulse generating circuit 22 to generate various kinds of control signals for control of the logical operation. The content of the remaining 11 bits is applied to the input changing circuit 8 of the input module 1 or the output changing circuit 9 of the output module 5 to designate the input or output address. The logical condition of the input contact at the address selected by the input changing circuit 8 is applied to a test flag circuit 27 through a line IOB. The test flag circuit 27, which is described hereinafter in more detail, includes a register to memorize the examination result of the logical condition of the selected input contact from the line IOB with a command identified by the decoder 26 and is primarily comprised by a flip-flop or flag FF10 to memorize the operation result of a logical OR function and a flip-flop or flag FF20 to memorize the operation result of a logical AND function as shown in FIG. 4. The examination result memorized in the test flag circuit 27 is applied to an output address selected by the output changing circuit 9 to control the operation of the output device through the output converting and holding circuit 10. The output converting the holding circuit 10 maintains the condition of the output device at a designated address in one of the flip-flops contained therein and transmits the same to the test flag circuit 27 through the line IOB, as in the case of the input converting circuit 7.

1. CONTROL PULSE GENERATING CIRCUIT

Figure 3:
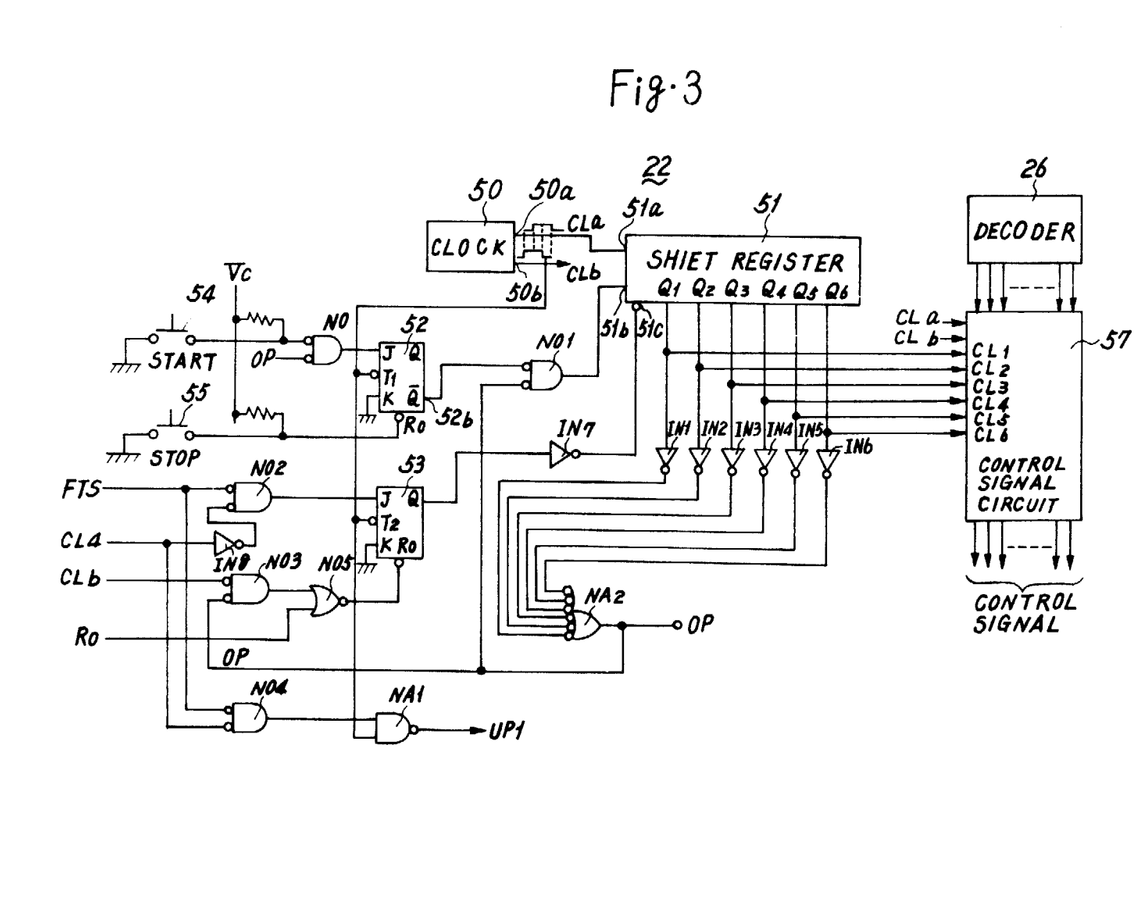
FIG. 3 is a circuit diagram showing a control pulse generating circuit which is included in the logic operation circuit.
Figure 5:
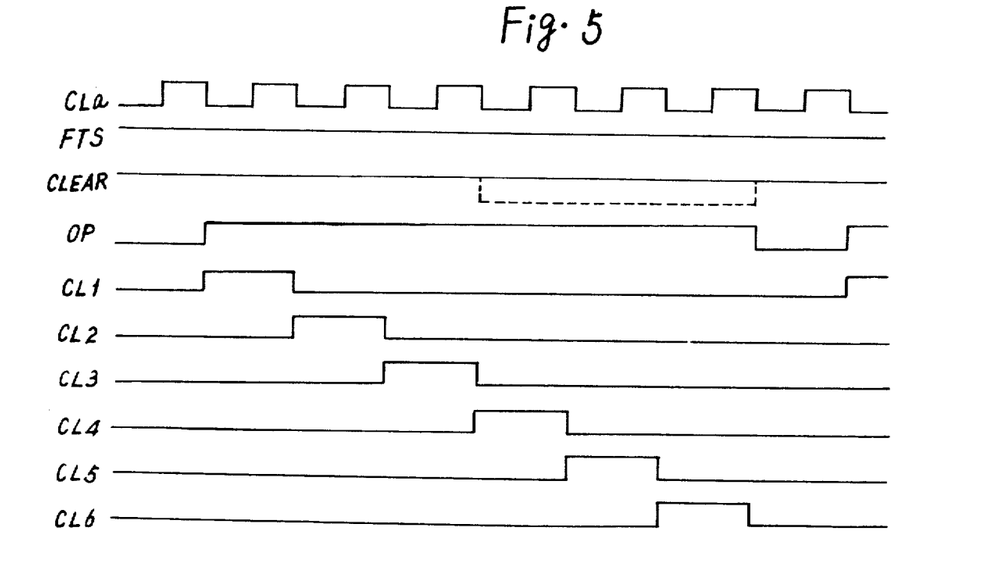
FIGS. 5, 6, and 7 show time charts of various control signals.
Figure 6:
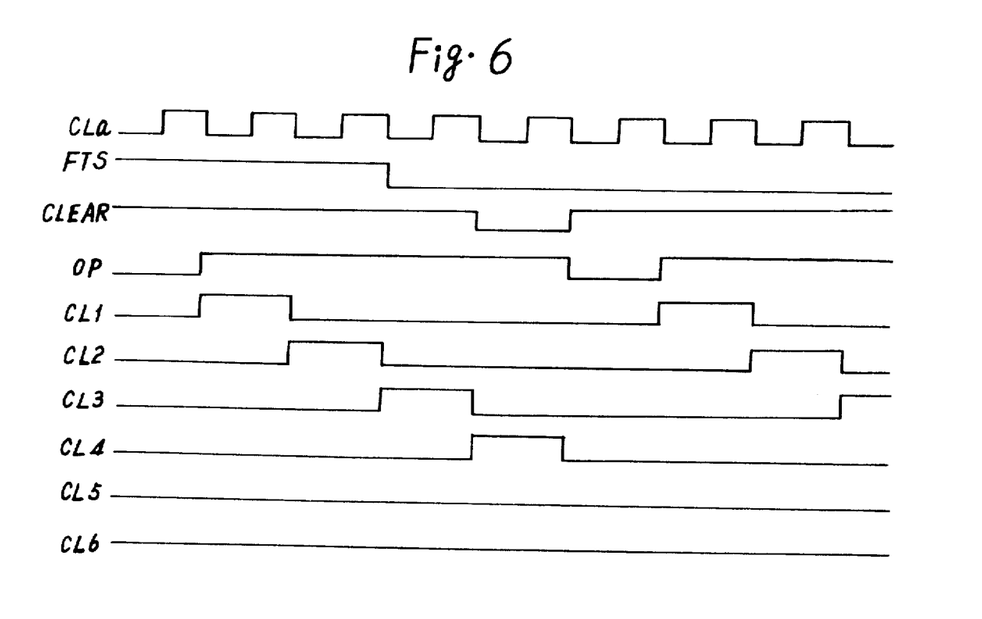

Referring to FIG. 3, the control pulse generating circuit 22 is constituted by a clock generating circuit 50, a shift register 51, a flip-flop 52 for start and stop, and a flip-flop 53 for cycle change. The clock generating circuit 50 has two output terminals 50a and 50b to generate clock pulses CLa and CLb, respectively. The output terminal 50a is connected to an input terminal 51a of the shift register 51. The other output terminal 50b is connected to trigger terminals T1 and T2 of the respective flip-flops 52 and 53 and an input terminal of a NAND gate NA1. The other input terminal 51b of the shift register 51 is connected to an output terminal of a NOR gate NO1. One input terminal of the NOR gate NO1 is connected to an output terminal of a NAND gate NA2 whose input terminals are connected to output terminals Q1 to Q6 of the shift register 51 through inverters IN1 to IN6, respectively. The other input terminal of the NOR gate NO1 is connected to a reset output terminal 52b of the flip-flop 52. The flip-flop 52 is set when a start button 54 is pressed and maintains an output from the reset output terminal 52b thereof at a low voltage signal, which is referred to as a ZERO signal, until the flip-flop 52 is reset as a result of a stop switch 55 being pressed. When the flip-flop 52 is reset, a high voltage signal, which is referred to as a ONE signal appears at the reset output terminal 52b thereof which is transmitted to the input terminal 51b of the shift register 51 through the NOR gate NO1 to apply a ZERO signal thereto. The shift register 51 starts a shift operation under the condition of a ONE signal being applied to the input terminal 51b thereof upon receipt of clock pulses CLa to the input terminal 51a thereof to generate control pulses CL2 to CL6 at the output terminals Q1 to Q6, respectively, as shown in FIG. 5. A ONE signal is applied to the input terminal 51b of the shift register 51 when and only when the outputs at output terminals Q1 to Q6 are in the ZERO-state so that an output ZERO signal from the NAND gate NA2 is applied to the input terminal of the NOR gate NO1. A clear terminal 51c of the shift register 51 is connected to the set output terminal of the flip-flop 53 through an inverter IN7. The flip-flop 53 is set when a cycle change instructing signal FTS from the test flag circuit 27 and the control pulse CL4 are applied and is reset when a cycle end signal OP of the shift register 52 becomes a ZERO signal and the clock pulse CLb is applied. While the flip-flop 53 is being set, a ZERO signal is applied to the clear terminal 51c through the inverter IN7 to clear the content of the shift register 51. Therefore, control pulses in the form of pulse trains CL1 to CL4 are generated without generating control pulses CL5 and CL6, as shown in FIG. 6. The case where the control pulses CL1 to CL6 are generated is hereinafter called a normal cycle and the case where only the control pulses CL1 to CL4 are generated is called a special cycle. In the special cycle, a cycle change is made to discontinue the execution of the logic operation in the test flag circuit 27 to thereby read out the next program.

Figure 7:
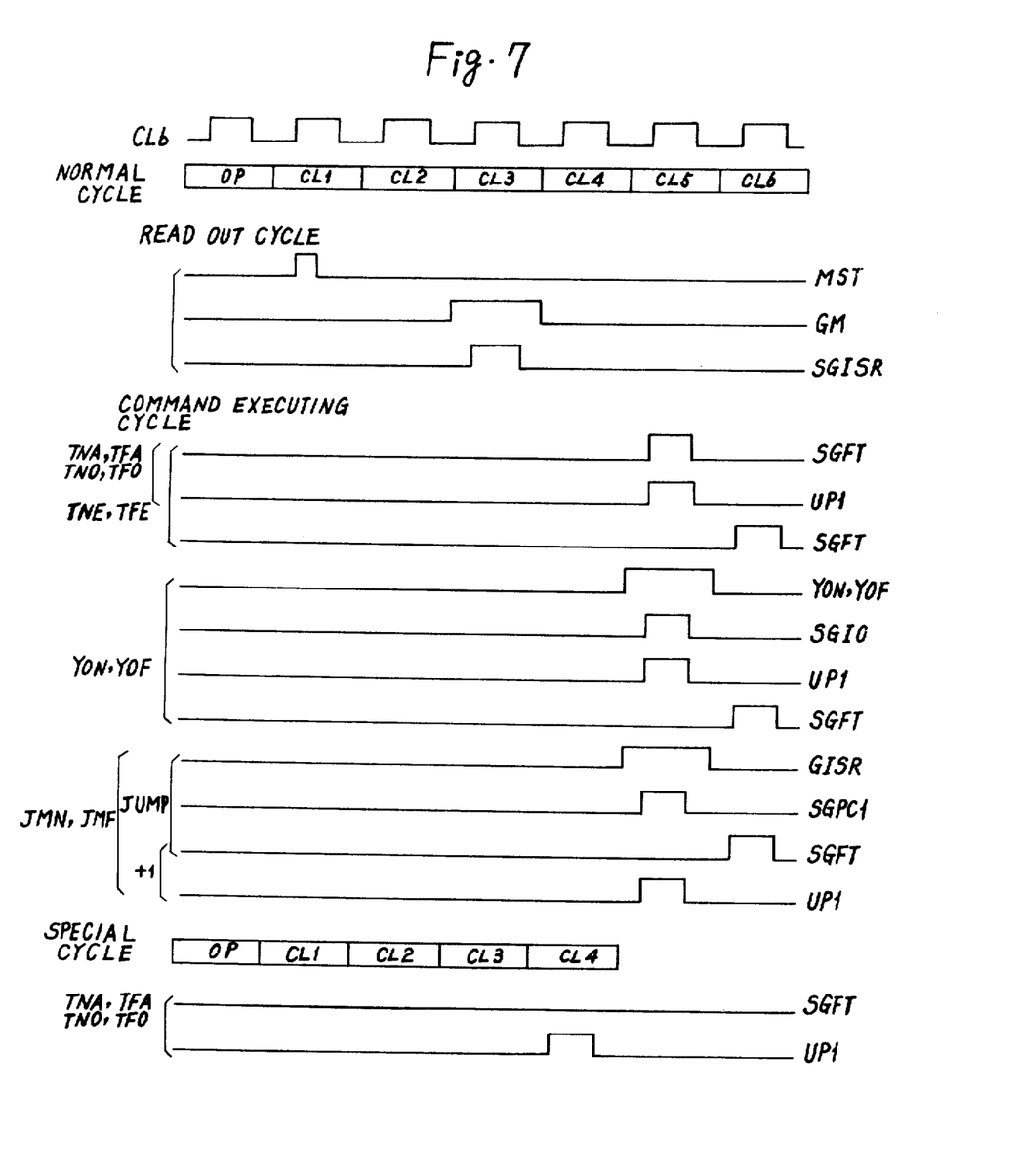

The control pulses CL1 to CL6, clock pulses CLa and CLb and control signals from the decoder 26 are applied to a control signal circuit 57 to generate control signals MST, GM and SGISR to execute the read out cycle during which the program is read out from the memory device 2 and control signals SGFT, UP1, SGID, GISR and SGPC1 for command executing cycle are generated as shown in FIG. 7.

It is to be understood that the control signals SGFT and UP1 for examine commands TNA, TFA, TNO and TFO in the special cycle are different from those in the normal cycle. More specifically, the control signal SGFT in the normal cycle is generated at the same timing as the control pulse CL5, but, in the special cycle, no control signal SGFT is generated. The control signal UP1 in the normal cycle is generated at the same timing as the control pulse CL5, but the control signal UP1 in the special cycle is generated at the same timing as the control pulse CL4.

2. TEST FLAG CIRCUIT

As shown in FIG. 4, the test flag circuit 27 is mainly constituted by logic operation circuits OLG and ALG to make a logic operation of the signal from line IOB (ZERO when the input contact is in the ON-state and ONE when the input contact is in the OFF-state) by an examine command (ZERO signal appears only at the terminal corresponding to the identified command) and flip-flops or flags FF10 and FF20 to memorize the result of the logic operation. The flag FF10 is to memorize the operation result of a logic OR function and is in a reset state at the initial stage.

The flag FF10 memorizes in the reset state thereof the unsatisfaction of the operation result of the logic OR function while the set state thereof memorizes the satisfaction of the operation result of the logic OR function. Once the flag FF10 is set, the flag FF10 is kept in the set state to apply a block signal to block gates BO1 and BO2 through a feedback line FBo to block the input signal from the line IOB and the examine command signal. The flag FF20 is to memorize the operation result of a logic AND function and is in a reset state at the initial stage. The flag FF20 memorizes in the reset state thereof the satisfaction of the operation result of the logic AND function while the set state thereof memorizes the unsatisfaction of the operation result of the logic AND function. Once the flag FF20 is set, the flag FF20 is kept in the set state to apply a block signal to block gates BA1 and BA2 through a feedback line FBa to block the input signal from the line IOB and the examine command signal.

The feedback lines FBo and FBa and the block gates BO1, BO2, BA1 and BA2 operate as follows.

2-1. THE CASE OF UNSATISFACTION OF A LOGIC OR FUNCTION

Under the reset state of the flag FF10 by unsatisfaction of the operation result of logic OR function, a ZERO signal appears on the feedback line FBo which is directly applied to AND gates A12, A14, A16 and A18 to thereby close the same. A ZERO signal on the line FBo is converted through an inverter IN10 into a ONE signal which is applied to AND gates A11, A13, A15 and A17 to thereby open the same. The AND gates A11 and A13 receive examine command signals TNO, TNE and TFO, TFE through NAND gates NA10 and NA11, respectively. The AND gate A15 receives the signal from the line IOB through an inverter IN40 and the AND gate A17 receives the signal from the line IOB. Therefore, the signal from the line IOB and the examine command signals TNO, TNE and TFO, TFE are applied to logic OR operation circuit OLG through AND gates A11, A13, A15, A17 and NOR gates NO10, NO11, NO12 and NO13 to execute the logic operation in accordance with the examine command signal.

The date terminal D1 of the flag FF10 receives a ONE signal when the examination result is satisfied and receives a ZERO signal when the examination result is not satisfied. Under the reset state of the flag FF10, since the cycle change instructing signal FTS is not generated, control pulses under the normal cycle are generated so that the trigger signal SGFT applied to the trigger terminal T1 of the flag FF10 is generated at the same timing as the clock pulse CL5. Therefore, when the trigger signal SGFT is applied, the flag FF10 is kept in the reset state if the date terminal D1 thereof receives a ZERO signal and the flag FF10 is set to generate a ONE signal from the set output terminal Q1 if the date terminal D1 thereof receives a ONE signal.

2-2. THE CASE OF STAISFACTION OF A LOGIC OR FUNCTION

Under the set state of the flag FF10 by satisfaction of the operation result of the logic OR function, a ONE signal appears on the feedback line FBo to change the open-close condition of the AND gates A11 to A18 of block gates BO1 and BO2. More specifically, the AND gates A11, A13, A15 and A17 connected to the feedback line FBo through the inverter IN10 are closed and the AND gates A12, A14, A16 and A18 are opened. Each of the opened AND gates A12, A14, A16, A18 receiving a ONE signal through an inverter IN30 outputs and applies the established signal (which is the same signal as that under the satisfaction of the examination result of a logical OR function) to the logic OR operation circuit OLG regardless of the condition of the signal from the line IOB and the examine command signal so that the D1 terminal of the flag FF10 receives ONE signal. Thus, the flag FF10 is kept in the set state and memorizes the satisfaction of the operation result of the logic OR function.

Under the set state of the flag FF10 whereby the set output terminal thereof is in the ONE state, when the examine command TNO or TFO is applied in accordance with the next program, the cycle change instructing signal FTS is generated. Under these conditions, when the control pulse CL4 is applied, the flag 53 for cycle change, as shown in FIG. 3, is set to thereby set the control pulse generating cycle circuit 22 for the special cycle. Therefore, when the operation result of the logic OR function is satisfied and the signal FTS is generated, the trigger terminal T1 of the flag FF10 receives no control signal SGFT, and the control signal UP1 to step the program counter 20 is generated at the same timing as the clock pulse CL4, to thereby start to read out the next program without generating the control pulses CL5 and CL6. Therefore, a substantial logic operation is not made and the command executing cycle is considerably shortened.

2-3 THE CASE OF SATISFACTION OF A LOGIC AND FUNCTION

Under the reset state of the flag FF20, a ZERO signal appears at the feedback line FBa so that AND gates A22, A24, A26 and A28 are closed and AND gates A21, A23, A25 and A27 connected to the feedback line FBa through an inverter IN20 are opened. The AND gates A21 and A23 receive examine command signals TNA and TFA through inverters IN32 and IN33, respectively and the AND gates A25 and A27 receive the signal from the line IOB. Therefore, the signal from the line IOB and the examine command signal TNA or TFA are applied to the logic AND operation circuit ALG through AND gates A21, A23, A25 and A27 and NOR gates NO20, NO21, NO22 and NO23 to execute the logic operation in accordance with the examine command signal. The data terminal D2 of the flag FF20 receives a ZERO signal by the satisfaction of the examination result and receives a ONE signal by the unsatisfaction of the examination result. Under the reset state of the flag FF20, since the cycle change instructing signal FTS is not generated, control pulses under the normal cycle are generated so that the trigger signal SGFT applied to the trigger terminal T2 of the flag FF20 is generated at the same timing as the clock pulse CL5. Therefore, when the trigger signal SGFT is applied, the flag FF20 is kept in the reset state if the data terminal D2 thereof receives a ZERO signal and the flag FF20 is set to generate a ONE signal from the set output terminal Q2 if the data terminal D2 thereof receives a ONE signal.

2-4. THE CASE OF UNSATISFACTION OF A LOGIC AND FUNCTION

Under the set state of the flag FF20 by unsatisfaction of the operation result of a logic AND function, a ONE signal appears at the feedback line FBa to change the open-close condition of the AND gates A21 to A28 of the block gates BA1 and BA2. Thus, the AND gates A21, A23, A25 and A27 connected to the feedback line FBa through the inverter IN20 are closed and the AND gates A22, A24, A26 and A28 are opened. Each of the opened AND gates A22, A24, A26 and A28 receiving ONE signals through the inverter IN30 outputs and applies the established signal (which is the same signal as that under the unsatisfaction of the examination result of a logical OR function) to the logic AND operation circuit ALG regardless of the condition of the signal from the line IOB and the examine command signal so that the D2 terminal of the flag FF20 receives a ONE signal. Thus, the flag FF20 is kept in the set state and memorizes the unsatisfaction of the operation result of a logic AND function.

Under the set state of the flag FF20 whereby the set output terminal thereof is in the ONE state, when the examine command TNA or TFA is applied, in accordance with the next program, the cycle change instructing signal FTS is generated. Under these conditions, when the control pulse CL4 is applied, the flag 53 for cycle change, as shown in FIG. 3, is set to thereby set the control pulse generating circuit 22 for the special cycle. Therefore, when the operation result of the logic AND function is unsatisfied and the signal FTS is generated, the trigger terminal T2 of the flag FF20 receives no control signal SGFT and the control signal UP1 to step the program counter 20 is generated at the same timing as the clock pulse CL4 to thereby start to read out the next program without generating the control pulses CL5 and CL6. Therefore, a substantial logical operation is not made and the command executing cycle is considerably shortened.

2-5. LOGIC OR OPERATION CIRCUIT OLG

The logic OR operation circuit OLG is constituted by NOR gates NO14, NO15, NO16 and NO17 to receive the control signal on the line IOB and the examine command signal TNO, TNE, TFO or TFE to thereby execute the logic operation of the input contact. One input terminal of the NOR gate NO14 receives through the AND gate A15 and the NOR gate NO12 a signal which is converted by an inverter IN40 from the signal on the line IOB. The other input terminal receives the examine command signal TNO or TNE through the NAND gate NA10, AND gate A11 and NOR gate NO10. Therefore, as shown in TABLE 2 if the examine command TNO or TNE is applied and the input contact is in the ON state so that a ZERO signal appears on the line IOB, the result of the examination is satisfied so that a ONE signal appears at the output terminal of the NOR gate NO14. Therefore, a ONE signal is applied to the data terminal D1 of the flag FF10 through the NOR gates NO16 and NO17. Under these conditions, when the trigger signal SGFT is applied to the trigger terminal T1 of the flag FF10, the flag FF10 is set to memorize the satisfaction of the logic OR operation. If the input contact is in the OFF state, a ONE signal appears on the line IOB so that the result of examination is unsatisifed to apply a ZERO signal to the data terminal D1 of the flag FF10. Therefore, even if the trigger signal SGFT is applied, the flag FF10 is not inverted to thereby memorize in the reset state thereof the unsatisfaction of the operation result of the logic OR function.

TABLE 2

|  | Input Contact is ON IOB = ZERO | Input Contact is OFF IOB = ONE |
| --- | --- | --- |
| TNO TNE =ZERO | Satisfaction D1 = ONE | Unsatisfaction D1 = ZERO |
| TFO TFE =ZERO | Unsatisfaction D1 =ZERO | Satisfaction D1 = ONE |
| TNA =ZERO | Satisfaction D2 = ZERO | Unsatisfaction D2 = ONE |
| TFA =ZERO | Unsatisfaction D2 = ONE | Satisfaction D2 = ZERO |

One input terminal of the NOR gate NO15 receives the signal on the line IOB through the AND gate A17 and NOR gate NO13 and the other input terminal thereof receives the examine command signal TFO or TFE through the NAND gate NA11, AND gate A13 and NOR gate NO11. Therefore, if the examine command TFO or TFE is applied and the input contact is in the ON state, the result of the examination is unsatisfied so that the flag FF10 is not set. On the other hand, if the input contact is in the OFF state, the result of the examination is satisfied to thereby set the flag FF10.

2-6. LOGIC OR FUNCTION TRANSFER CIRCUIT LSF

Figure 11:
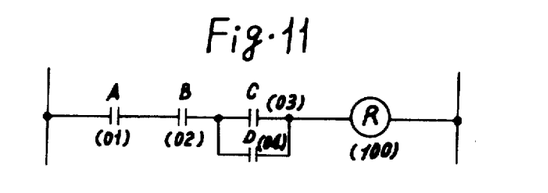
Figure 12:
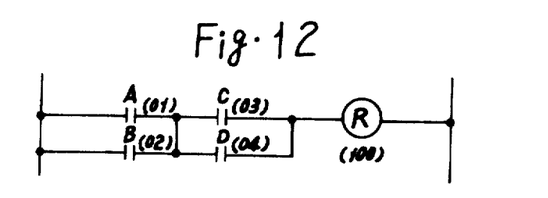

The examine command TNE or TFE is used to make a logic OR operation of the input contact and thereafter to transfer the content of the flag FF10 to the flag FF20. This examine command TNE or TFE is needed to identify the examination result of a logic OR function because an output terminal FT for identifying the examination result is connected to the flag FF20. The examine command TNE or TFE is also needed to take the final examination result from the output terminal FT if a group of logic AND functions and a group of logic OR functions are connected in series, as shown in FIG. 11, or if a group of logic OR functions and another group of logic OR functions are connected in series, as shown in FIG. 12. To transfer the content of the flag FF10 to the flag FF20 means that a group of logic AND functions and a group of logic OR functions are examined by the condition of a logic AND function. In such transferring of a logic function, if a logic OR function is satisfied, the flag FF20 is kept in that state regardless of whether the flag FF20 is in its set or reset state. Only when the logic OR function is unsatisfied is the flag FF20 changed to be set. In other words, since the flag FF20 memorizes in the reset state thereof the satisfaction of the logic AND function, the logic AND function is satisfied even after transferring the logic function if the logic OR function is satisfied so that the flag FF20 is kept in the reset state. If the logic AND function is unsatisfied, the whole logic function is not satisfied regardless of whether the logic OR function is satisfied or unsatisfied so that the flag FF20 is set.

For this reason, as shown in FIG. 4, the logic OR function transferring circuit LSF is connected in such a manner that when a ZERO signal appears at the set output terminal Q1 of the flag FF10 upon the application of the examine command TNE or TFE (that is, unsatisfaction of the logic OR function), a ONE signal is applied to the data input terminal D2 of the flag FF20 through NOR gate NO43, NAND gate NA42 and NOR gate NO27 and a ZERO signal is applied to the data input terminal D1 of the flag FF10. The trigger signal SGFT applied to the trigger terminals T1 and T2 of the flags FF10 and FF20 is generated at the time the clock pulses CL5 and CL6 are generated.

2-7. LOGIC AND OPERATION CIRCUIT ALG

The logic AND operation circuit ALG is constituted by NOR gates NO24, NO25, NO26 and NO27 to receive the control signal on the line IOB and the examine command signal TNA or TFA to thereby execute the logic operation of the input contact. One input terminal of the NOR gate NO24 receives a control signal on the line IOB through the AND gate A25 and NOR gate NO22. The other input terminal receives the examine command signal TNA through the inverter IN32, AND gate A21 and NOR gate NO20. Therefore, as shown in TABLE 2, if the examine command TNA is applied and the input contact is in the OFF state so that a ONE signal appears on the line IOB, the result of the examination is unsatisfied so that a ONE signal appears at the output terminal of the NOR gate NO24. Therefore, a ONE signal is applied to the data terminal D2 of the flag FF20 through the NOR gates NO26 and NO27. Under these conditions, when the trigger signal SGFT is applied to the trigger terminal T2 of the flag FF20, the flag FF20 is set to memorize the unsatisfaction of the logic AND operation. If the input contact is in the ON state, a ZERO signal appears on the line IOB so that the result of the examination is satisfied to apply a ZERO signal to the data terminal D2 of the flag FF20. Therefore, even if the trigger signal SGFT is applied, the flag FF20 is not set to thereby memorize in the reset state thereof the satisfaction of the operation result of the logic AND function.

One input terminal of the NOR gate NO25 receives the signal on the line IOB through the inverter IN40, AND gate A27 and NOR gate NO23 and the other input terminal thereof receives the examine command signal TFA through the inverter IN33, AND gate A23 and NOR gate NO21. Therefore, if the examine command TFA is applied and the input contact is in the ON state, the result of the examination is unsatisfied so that a ONE signal is applied to the data terminal D2 of the flag FF20 to thereby set the flag FF20. On the other hand, if the input contact is in the OFF state, the result of the examination is satisfied so that a ZERO signal is applied to the data terminal D2 of the flag FF20. Thus, the flag FF20 is not set.

2-8. IDENTIFICATION OF RESULT OF LOGIC OPERATION

In case or execution of the output command YON or YOF, of Jump command JMY or JMN, identification of the result of the logic operation is made so that, in response to a signal appearing at an output terminal FT of the test flag circuit 27, energization or deenergization of the output devices, jumping of the program and an execution of a subsequent program without jump is made. The flags FF10 and FF20 are both reset upon an identification of the examination result by these examine commands. For this purpose, examine command signals YON, YOF, JMY and JMN are applied to the reset terminals of the flags FF10 and FF20 through NAND gates NA61, NA62 and NA63 and an inverter IN64 so that a reset signal is applied at the same timing as the control pulse CL6 is generated.

3. CYCLE CHANGE INSTRUCTING CIRCUIT

As shown in FIG. 4, a cycle change instructing circuit SCH is constituted by NAND gates NA30, NA31, NA32, NA33 and NA34 and an inverter IN31. One input terminal of the NAND gate NA32 is connected to the set output terminal Q1 of the flag FF10 and the other input terminal thereof is connected to receive the examine command signal TNO or TFO through the NAND gate NA30.

One input terminal of the NAND gate NA33 is connected to the set output terminal Q2 of the flag FF20 and the other input terminal thereof is connected to receive the examine command signal TNA or TFA through the NAND gate NA31. Therefore, the cycle change is instructed, when the logic OR function is satisfied, to set the flag FF10. The examine command TNO or TFO is applied so that a ZERO signal appears at the output terminal of the NAND gate NA32. When the logic AND function is unsatisfied, the cycle change is instructed to set the flag FF20 and the examine command TNA or TFA is applied so that a ZERO signal appears at the output terminal of the NAND gate NA33. In either case, a ZERO cycle change instructing signal FTS is generated at an output terminal 60 through the NAND gate NA34 and the inverter IN31. The signal FTS sets the flag 53 at the time the control pulse CL4 is generated to apply a ZERO signal to the clear terminal 51c of the shift register 51 through the inverter IN7 as described hereinabove. Under these conditions, when the clock pulse CLa, as a shift pulse, is applied to the input terminal 51a of the shift register 51, ZERO signals appear at the output terminals Q1 to Q6 thereof so that the control pulses CL5 and CL6 are not generated. When the outputs of the output terminals Q1 to Q6 become ZERO, the output of the NAND ate NA2 becomes ZERO so that the reset signal is applied through the NOR gate NO3 and NO5 to the flag 53 to thereby reset the same. At the same time, ONE signal is applied to the input terminal 51b of the shift register 51 and the clock pulse CLa is applied to the input terminal 51a so that the clock pulses CL1 to CL4 are again generated. When the control pulse CL4 generated, the flag 53 is again set to thereby clear the shift register 51. Thereafter the flag 53 is reset. Therefore, the control pulses CL1 to CL4 are repeatedly generated so that one program is executed by a shorter cycle without control pulses CL5 and CL6. Thus, the test flag circuit 27 does not execute the logic operation of the signal on the line IOB by the examine command to thereby substantially skip the program of the examine command.

Figure 8:
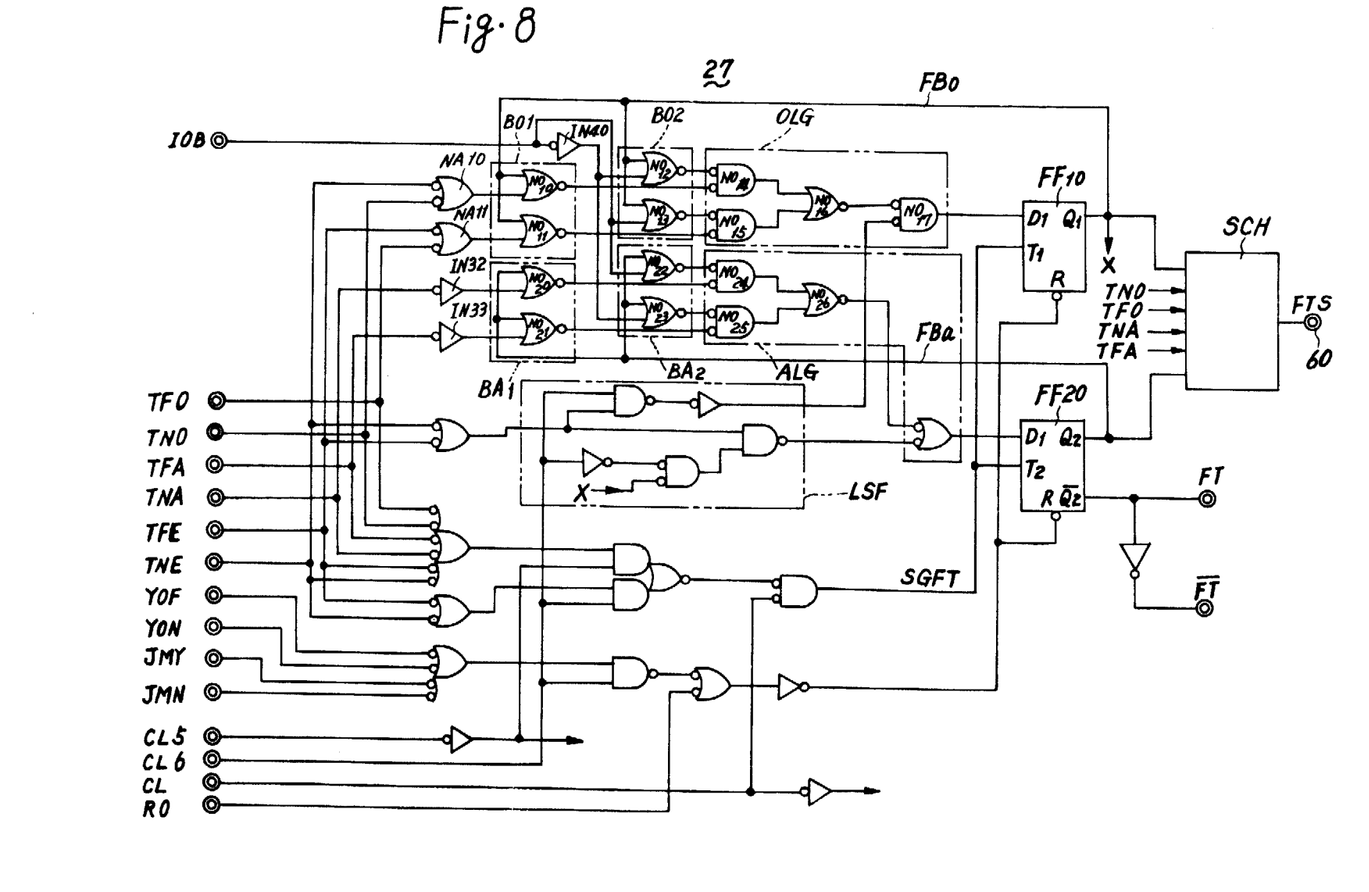
FIG. 8 is another embodiment of a test flag circuit.

FIG. 8 shows a second embodiment of the test flag circuit 27. In the second embodiment, the block gates BO1, BO2, BA1 and BA2 are constituted only by NOR gates so that the signal on the feedback lines FBo and FBa are directly applied to the input terminals of the NOR gates. Therefore, when the logic OR function is satisfied, the outputs of the NOR gates NO10, NO11, NO12 and NO13 become ZERO and are kept at constant conditions regardless of the conditions of the signal on the line IOB and the examine command signals TNO, TFO, TNE or TFE so that the signal on the line IOB and the examine command signal are substantially blocked.

When the logic AND function is satisfied, the signal on the line IOB and the examine command signal are similarly blocked at the NOR gates NO20, NO21, NO22 and NO23. Therefore, the same operation as in the first embodiment is performed. The other constructions except for the block gates BO1, BO2, BA1 and BA2 being the same as in the first embodiment, the detailed description thereof is omitted.

The process of the program and the logic operation will now be described with reference to simple sequence circuits. A sequence circuit shown in FIG. 9 is a simple logic AND circuit. Input contacts A, B and C shown in FIG. 9 are respectively connected to 01, 02 and 03 addresses of the input module 1. A relay coil R, as an output element, is connected to the 100 address of the output module 5. The program for this sequence circuit is shown in TABLE 3.

TABLE 3

| | Memory Address | Command | Connected Address |
|---|---|---|---|
| 1 | N | TNA | 01 (A) |
| 2 | N+1 | TFA | 02 (B) |
| 3 | N+2 | TNA | 03 (C) |
| 4 | N+3 | YON | 100 (R) |

The letter N at the memory address indicates a specific address in the memory device 2 and the memory address is changed by the every command. In the course of execution of the program, when the address N is designated by the program counter 20, the command TNA 01 is read out and preset in the instruction register 25. The signal appearing at the contact A connected to the 01 address of the input module 1 is selected and applied to the test flag circuit 27 through the line IOB. The examine command is distinguished and the signal thereof is applied to the terminal TNA and then to the input terminal of the NOR gate NO24 through the inverter IN32, AND gate A21 and NOR gate NO20. The other input terminal of the NOR gate NO24 receives the signal on the line IOB through the AND gate A25 and NOR gate NO22. If the input contact A is in its ON state, a ZERO signal appears on the line IOB. On the other hand, if the input contact A is in its OFF state, a ONE signal appears on the line IOB. Therefore, the data input terminal D2 of the flag 20 receives through the NOR gates NO26 and NO27 a ZERO signal if the input contact A is in its ON stage and a ONE signal if the input contact A is in its OFF stage. Under these conditions, the trigger signal SGFT is applied to the trigger terminal T2 of the flag FF20. Thus, if the result of the logic operation is satisfied, the flag 20 remains reset. On the contrary, if the result of the logic operation is unsatisfied, the flag 20 is set. Under the condition of unsatisfaction of the logic operation so that the flag FF20 is set, when the examine command in the subsequent address N+1 is read out and identified as the examine command TFA, the cycle change instructing signal FTS is generated through the NAND gates NA33 and NA34 and the inverter IN31 to change the performing cycle, as described before. The block gates BA1 and BA2 are converted to block the signal on the line IOB and the examine command signal to thereby discontinue the logic operation in accordance with the examine commands at N+1 and N+2 addresses. The command at the N+3 address is not an examine command but the output command YON. Thus, the cycle change instructing signal FTS disappears under the output command YON so that the normal cycle is resumed. Since the flag FF20 is set, the signal for deenergizing the relay coil R connected to the 100 address of the output module 5 is generated. As shown in TABLE 4, when the input contacts A and C are in the ON state and contact B is in the OFF state, the relay coil R is energized by the output command YON at the N+3 address. In other cases, the relay coil R is not energized.

TABLE 4

| A | B | C | |
|---|---|---|---|
| ON | OFF | ON | energization of relay R |
| ON | OFF | OFF | ⎤ |
| ON | ON | — | ⎦ deenergization of relay R |
| OFF | — | — | |

In TABLE 4, the sign "-" indicates that the substantial discontinuance of the logic operation is made by the block gates being converted. Together with the discontinuance, the change in the executing cycle is made to thereby shorten the executing time. Thus, the sequential logic operation in accordance with the program is not always performed by the discontinuance of the logic operation and the cycle change to thereby increase the control speed in order to avoid the misoperation and to increase the reliability of the control.

A sequence circuit shown in FIG. 10 is a simple logic OR circuit. In order to take the final examination result of the logic OR function from the output terminal FT of the flag FF20, it is necessary to logically transfer the content of the flag FF10 to the flag FF20. A program for this purpose is shown in TABLE 5.

TABLE 5

| | Memory Address | Command | Connected Address |
|---|---|---|---|
| 1 | N | TNO | 01(A) |
| 2 | N+1 | TFO | 02(B) |
| 3 | N+2 | TNE | 03(C) |

TABLE 5-continued

| Memory Address | Command | Connected Address |
|---|---|---|
| 4 | N+3 | YON | 100(R) |

When the examine command TNO or TNE is applied, the command signal thereof is applied to the input terminal of the NOR gate NO14 through the NAND gate NA10, AND gate A11 and NOR gate NO10. The other input terminal of the NOR gate NO14 receives the control signal on the line IOB through the inverter IN40, AND gate A15 and NOR gate NO12.

When the examine command TFO is applied, the command signal thereof is applied to the input terminal of the NOR gate NO15 through the NAND gate NA11, AND gate A13 and NOR gate NO11. The other input terminal of the NOR gate NO15 receives the control signal on the line IOB through the AND gate A17 and NOR gate NO13. When the input contact A is in the ON stage, a ONE signal is applied to the data input terminal D1 of the flag FF10. Therefore, when the trigger signal SGFT is applied, the flag FF10 is set so that the block gates BO1 and BO2 are converted to thereby block the signal on the line IOB and the examine command signal to discontinue the logic operation by the examine commands at the N+1 and N+2 addresses. Since the command at the N+1 address is the examine command TFO, the cycle change instructing signal FTS is generated to change the executing cycle. However the examine command TNE at the N+2 address is executed under the normal executing cycle. Since the block gates BO1 and BO2 block the signal on the line IOB and the examine command signal TNE, the logic operation is not effected, but the transfer of the logic function is made. This transfer is performed by leaving the flag FF20 reset since the content of the flag FF10 memorizes the satisfaction of the logic OR function. Therefore, when the control pulse CL6 is applied, a ZERO signal appears at the output terminal of a NAND gate NA41 to thereby apply a ZERO signal to the data input terminal D1 of the flag FF10 through an inverter IN41 and NOR gate NO17. The trigger signal SGFT is applied to the terminal T1 at the time the clock pulse CL6 is generated to reset the flag FF10. The command YON at the N+3 address being the output command, the signal FTS is not generated so that the normal executing cycle is performed. Since the flag FF20 is kept in the reset state even after the logic transfer, the signal for energizing the relay coil R connected to the 100 address of the output module 5 is generated. As shown in TABLE 6, even if the input contact A is in the OFF state, the logic operation of the contact C is discontinued to energize the relay coil R is the contact B is in the OFF state.

TABLE 6

| A | B | C | |
|---|---|---|---|
| ON | — | — | energization of relay R |
| OFF | OFF | — | |
| OFF | ON | ON | |
| OFF | ON | OFF | deenergization of relay R |

The relay coil R is deenergized only when the input contacts A and C are in the OFF state and contact B is in the ON state. In this case, the logic transfer under the command at the N+2 address is such that a ZERO signal is applied to the input terminal X of the NOR gate NO43 since the flag FF10 is reset because of unsatisfaction of the logic OR function. When the control pulse CL6 is applied, a ONE signal is applied to the data input terminal D2 of the flag FF20 through the NAND gate NA42 and NOR gate NO27. When the trigger signal SGFT is applied, the flag FF20 is set to memorize the unsatisfaction of the examination result. Since a ZERO signal appears at the terminal FT, the relay coil R is deenergized in accordance with the command at the N+3 address. In such a sequence control of the logic OR function, a partial discontinuance of the logic operation is made.

A sequence circuit shown in FIG. 11 is a combined circuit of the logic AND function and the logic OR function. The input contacts A and B are examined by the logic AND function and the input contacts C and D are examined by the logic OR function. After the examination of the input contact D, when the content of the flag FF10 is logically transferred to the flag FF20, a combination of a group of input contacts A and B and a group of input contacts C and D are examined by logic AND function so that the reset output terminal $\overline{Q2}$ of the flag FF20 generates a signal in accordance with the final examination result of the logic function A.B (C+D). The program of this sequence circuit is shown in TABLE 7 and the status of the examination result is shown in TABLE 8.

TABLE 7

| Memory Address | Command | Connected Address |
|---|---|---|
| 1 | N | TNA | 01(A) |
| 2 | N+1 | TNA | 02(B) |
| 3 | N+2 | TNO | 03(C) |
| 4 | N+3 | TNE | 04(D) |
| 5 | N+4 | YON | 100(R) |

TABLE 8

| A | B | C | D | |
|---|---|---|---|---|
| ON | ON | ON | — | |
| ON | ON | OFF | ON | energization of relay R |
| ON | OFF | — | — | |
| OFF | — | — | — | deenergization of relay R |

A sequence circuit shown in FIG. 12 is a combined circuit of logic OR functions. A group of input contacts A and B is examined by the logic OR function, the result of which is logically transferred to the flag FF20. Another group of input contacts C and D is then examined by the logic OR function, the result of which is again logically transferred to the flag FF20. Therefore, the flag FF20 generates a signal in response to the final examination result of logic function (A+B).(C+D). The program of this sequence circuit is shown in TABLE 9 and the status of the examination result is shown in TABLE 10.

TABLE 9

| Memory Address | Command | Connected Address |
|---|---|---|
| 1 | N | TNO | 01(A) |
| 2 | N+1 | TNE | 02(B) |
| 3 | N+2 | TNO | 03(C) |
| 4 | N+3 | TNE | 04(C) |
| 5 | N+4 | YON | 100(R) |

TABLE 10

| A | B | C | D | |
|---|---|---|---|---|
| ON | — | ON | — | |
| OFF | ON | OFF | ON | ⎫ |
| ON | — | OFF | ON | ⎬ energization of relay R |
| OFF | ON | ON | — | ⎭ |
| OFF | OFF | OFF | OFF | deenergization of relay R |

As described above, according to the present invention, the logic operation may be discontinued by a partial examination result of the input conditions to be examined and a control change, to shorten the command executing cycle, may be made to thereby (1) increase the control speed, (2) avoid possible malfunctions and (3) increase the reliability of the control system.

Obviously, numerous modifications and variations of the present invention are possible in light of the above teachings. It is therefore to be understood that within the scope of the teaching herein and the appended claims, the invention may be practiced otherwise than is specifically described herein.

What is claimed as new and desired to be secured by Letters Patent of the United States is:

1. A programmable sequence controller comprising:
   memory means for memorizing a sequence program comprising a train of instructions identified respectively by memory addresses thereof, each of said instructions having an examine command and an address information therein;
   an input module operatively connected to a plurality of addressed external input devices for converting states of said external input devices into logical values;
   an output module operatively connected to a plurality of addressed external output devices to be energized or deenergized;
   a logic operation circuit operatively connected to said memory means and to said input and output modules;
   reading means for reading out and feeding said train of instructions from said memory means to said logic operation circuit;
   said logic operation circuit comprising:
   circuit means for examining a logical value of one of said external input devices specified by the address information of one of said instructions with one examine command of said one of said instructions read out by said reading means;
   second memory means for temporarily memorizing an examined result of said circuit means;
   said output module being operable to energize or deenergize one of said addressed external output devices in response to an output of said second memory means; and
   discontinuance means operatively connected to said second memory means for causing said circuit means to discontinue a next examination of a logical value of another of said external input devices specified by the address information of another of said instructions with another examine command of said another of said instructions read out by said reading means to execute a logic operation nonsequentially when said second memory means memorizes satisfaction of the preceding examination of the logical value of said one of said external input devices with said one examine command of a logical OR function or unsatisfaction of the preceding examination of the logical value of said one of said external input devices with said one examine command of a logical AND function.

2. A programmable sequence controller according to claim 1 wherein said logic operation circuit further comprises:
   a control pulse generating circuit for selectively and cyclically generating a first train of control pulses and a second train of control pulses to cause the program to be read out and a logic operation to be executed, one cycle of said second train of control pulses being shorter than that of said first train of control pulses;
   said second memory means memorizing an examined result of said circuit means only when said first train of control pulses is generated; and
   a cycle change instructing circuit to generate a cycle change signal for causing said control pulse generating circuit to generate said second train of control pulses when said second memory means memorizes satisfaction of the preceding examination of the logical value of said one of said external input devices with said one examine command of a logical OR function or unsatisfaction of the preceding examination of the logical value of said one of said external input devices with said one examine command of a logical AND function.

3. A programmable sequence controller according to claim 2 wherein said control pulse generating circuit comprises a clock generating circuit for generating clock pulses; and a shift register for selectively and cyclically generating said first and second train of control pulses in response to said clock pulses;
   said shift register being operable to generate said second train of control pulses in response to said cycle change signal.

4. A programmable sequence controller comprising:
   memory means for memorizing a sequence program comprising a train of instructions identified respectively by memory addresses thereof, each of said instructions having an examine command and an address information therein;
   an input module operatively connected to a plurality of addressed external input devices for converting states of said external input devices into logical values;
   an output module operatively connected to a plurality of addressed external output devices to be energized or deenergized;
   a logic operation circuit operatively connected to said memory means and to said input and output modules;
   reading means for reading out and feeding said train of instructions from said memory means to said logic operation circuit;
   said logic operation circuit comprising:
   first circuit means for examining a logical value with an examine command of a logical AND function read out by said reading means;
   first memory means for temporarily memorizing an examined result of said first circuit means;
   second circuit means for examining a logical value with an examine command of a logical OR function read out by said reading means;
   second memory means for temporarily memorizing an examined result of said second circuit means;

first discontinuance means operatively connected to said first memory means for causing said first circuit means to discontinue a next examination of a logical value with an examine command of a logical AND function read out by said reading means to execute a logic operation non-sequentially when said first memory means memorizes unsatisfaction of the preceding examination; and second discontinuance means operatively connected to said second memory means for causing said second circuit means to discontinue a next examination of a logical value with an examine command of a logical OR function read out by said reading means to execute a logic operation non-sequentially when said second memory means memorizes satisfaction of the preceding examination.

5. A programmable sequence controller according to claim 4 wherein said logic operation circuit further comprises:

a control pulse generating circuit for selectively and cyclically generating a first train of control pulses and a second train of control pulses to cause the program to be read out and a logic operation to be executed, one cycle of said second train of control pulses being shorter than that of said first train of control pulses;

said first and second memory means memorizing examined results of said first and second circuit means, respectively, only when said first train of control pulses is generated; and a cycle change instructing circuit to generate a cycle change signal for causing said control pulse generating circuit to generate said second train of control pulses when said first and second memory means memorize unsatisfaction of the preceding examination and satisfaction of the preceeding examination, respectively.

6. A programmable sequence controller according to claim 5 wherein said control pulse generating circuit comprises a clock generating circuit for generating clock pulses; and a shift register for selectively and cyclically generating said first and second train of control pulses in response to said clock pulses;

said shift register being operable to generate said second train of control pulses in response to said cycle change signal.

7. A programmable sequence controller according to claim 4 wherein said logic operation circuit further comprises:

a logic transfer circuit for transferring the content of said second memory means to said first memory means at the end of an examination of a logical value with an examine command of a logical OR function.

* * * * *

UNITED STATES PATENT AND TRADEMARK OFFICE
CERTIFICATE OF CORRECTION

PATENT NO. : 3,996,565
DATED : 12/7/76
INVENTOR(S) : Nakao et al.

It is certified that error appears in the above-identified patent and that said Letters Patent is hereby corrected as shown below:

On the Title Page, Item [73]

--Assignee information is incorrectly recorded. It should read:

Toyoda Koki Kabushiki Kaisha;
Toyota Jidosha Kogyo Kabushiki Kaisha, both of Japan--

Signed and Sealed this

Seventeenth Day of May, 1988

Attest:

DONALD J. QUIGG

*Attesting Officer*     *Commissioner of Patents and Trademarks*